(12) United States Patent
Lundh et al.

(10) Patent No.: US 8,400,973 B2
(45) Date of Patent: Mar. 19, 2013

(54) METHOD AND NODE FOR DETERMINING BANDWIDTH ALLOCATIONS IN A RADIO COMMUNICATION NETWORK

(75) Inventors: Peter Lundh, Skarholmen (SE); Szilveszter Nádas, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 932 days.

(21) Appl. No.: 12/064,956

(22) PCT Filed: Aug. 26, 2005

(86) PCT No.: PCT/SE2005/001248
§ 371 (c)(1),
(2), (4) Date: Sep. 17, 2008

(87) PCT Pub. No.: WO2007/024168
PCT Pub. Date: Mar. 1, 2007

(65) Prior Publication Data
US 2009/0215462 A1    Aug. 27, 2009

(51) Int. Cl.
*H04W 4/00* (2009.01)
(52) U.S. Cl. ........ 370/329; 370/231; 370/235; 370/229; 370/477; 370/468; 455/177; 455/200; 455/266
(58) Field of Classification Search .................. 455/177, 455/200, 266; 370/329, 231, 235, 229, 395.21, 370/468, 477
See application file for complete search history.

(56) References Cited

U.S. PATENT DOCUMENTS

| | | | |
|---|---|---|---|
| 6,208,619 B1 * | 3/2001 | Takeuchi | 370/229 |
| 2003/0045307 A1 | 3/2003 | Arviv et al. | |
| 2003/0123414 A1 | 7/2003 | Tong et al. | |
| 2004/0064577 A1 * | 4/2004 | Dahlin et al. | 709/235 |
| 2004/0071108 A1 * | 4/2004 | Wigell et al. | 370/328 |
| 2005/0239435 A1 * | 10/2005 | Ikeda et al. | 455/403 |
| 2006/0034168 A1 * | 2/2006 | Bakker et al. | 370/229 |
| 2008/0165888 A1 * | 7/2008 | Wiggins et al. | 375/295 |

FOREIGN PATENT DOCUMENTS

| | | |
|---|---|---|
| EP | 1 489 770 A2 | 12/2004 |
| WO | WO 00/14865 A1 | 3/1999 |
| WO | WO 2004/084509 A2 | 9/2004 |
| WO | WO 2005/029790 A2 | 3/2005 |
| WO | WO 2005104672 A2 | 11/2005 |

OTHER PUBLICATIONS

Using Flow Control for HSDPA Congestion Control; TSG-RAN Working Group 3 meeting #47; Tdoc R3-050572; Athens Greece, May 9-13, 2005.

* cited by examiner

*Primary Examiner* — Brandon Renner
*Assistant Examiner* — Abdelnabi Musa

(57) ABSTRACT

A network includes a first node and a second node and data frames are transmitted from the first node to the second node. Each of the data frames carry information belonging to one of a plurality of data flows. In a flow control unit (125) there is an estimate or measure determining unit (1201) for determining for each of the data flows, at the ends of first time periods having a predetermined first length, an estimate of or a measure representing the total number of received data frames that have been faulty during the first time period. A reference calculating unit (1101) is connected to the estimate or measure determining unit for calculating, based on the determined estimate or measure, a bandwidth capacity reference value determining the currently maximum allowable bandwidth for transmission from the data transmitting node to the data receiving node. The first node can be a radio network controller and the second node a radio base station, the data frames forwarded in an HS-DSCH over an Iub interface.

14 Claims, 8 Drawing Sheets

METHOD AND NODE FOR DETERMINING BANDWIDTH ALLOCATIONS IN A RADIO COMMUNICATION NETWORK

FIELD OF THE INVENTION

The present invention relates to flow control for transmission of data frames from a node to another node, in particular a network including a first node and a second node or a data transmitting node and a data receiving node, and a method of transmitting data frames from a first node to a second node.

BACKGROUND

The universal mobile telecommunications system (UMTS) is a network technology allowing transmission both of voice and high-speed data. It is part of the third-generation (3G) wireless standards, as specified by the Third-generation partnership project (3GPP). Wideband code-division multiple access (WCDMA), also called wideband CDMA, is one method for radio transmission used in UMTS. UMTS is a development of GSM/GPRS supporting packetized voice and data transmissions.

The method called high speed downlink packet access (HSDPA) is an enhancement of UMTS for increasing the capability of transmitting data, resulting in a reduced cost per transmitted bit and a greater spectral efficiency, in addition to significant improvements in downlink data speeds. HSDPA can give improvements of at least two to three times the current capacity. It is based on the WCDMA standard and uses the same spectrum. HSDPA uses quadrature phase shift keying (QPSK) and 16-quadrature amplitude modulation (16QAM).

The HSDPA method uses a distributed architecture in order to achieve a low delay link adaptation by performing the most important process steps in the radio base stations (RBSs) and thus close to the air interface, see FIG. 1. HSDPA uses well established processing steps, including fast physical layer (L1) retransmission for faulty packets, combining and link adaptation techniques, to obtain improved packet data transmission.

The HSDPA process steps basically include:
scheduling in the radio base stations for the downlink packet data operation;
higher-order modulation;
adaptive modulation and coding;
hybrid automatic repeat requests (HARQs) for retransmissions;
physical layer feedback of the momentary channel condition; and
transmission in a high-speed downlink shared channel (HS-DSCH) allowing several users to share an air interface channel.

In the following some important features of HSDPA will be described.

1. Adaptive modulation and coding

HSDPA uses advanced link adaptation and adaptive modulation and coding.

2. Fast scheduling

In HSDPA data traffic is scheduled in the radio base stations. HSDPA uses information on channel quality, terminal capabilities, quality of service (QoS), and power/code availability to achieve efficient scheduling of data packet transmissions.

3. Past L1 retransmissions

When a link error occurs, a mobile terminal immediately requests the retransmission of the lost or erroneous data packets. This operation is denoted as a method including hybrid automatic repeat requests (HARQs) for reducing the delays in and increasing the efficiency of retransmissions. HARQ control is performed in the radio base stations, as illustrated in FIG. 2.

4. Channel quality feedback

In the radio base stations, according to the HSDPA method, estimates of the channel quality of each active user are collected and used. This feedback provides current information on a wide range of channel variable physical layer conditions, including power control, ack/nack ratio, QoS, and HSDPA-specific user feedback.

5. High-speed downlink shared channels (HS-DSCHs)

HSDPA operation is carried in high-speed downlink shared channels using a frame length of only two milliseconds, compared to frame lengths of 10, 20, 40 or 80 ms used in previously used downlink shared channels (DSCHs). Such downlink shared channels are downlink transport channels, each of which may be shared by several user equipments. A downlink shared channel is used to carry dedicated control or traffic data from the SRNC (Serving Radio Network Controller). A DSCH will be associated with one or several downlink DCHs (Dedicated Channels). The HS-DSCHs provide 16-level quadrature amplitude modulation (16-QAM), link adaptation, and the combining of retransmissions in L1 with HARQs. HSDPA uses high-speed shared control channels (HS-SCCHs) to carry the required modulation and retransmission information. Uplink high-speed dedicated physical control channels (HS-DPCCHs) carry automatic repeat request (ARQ) acknowledgement messages, provide downlink quality feedback and transmit other necessary control information in the uplinks.

HSDPA requires a flow control algorithm or method that controls the transmission of data frames in an HS-DSCH, as specified by e.g. TS 25.401 from 3GPP, between a radio network controller and a radio base station. The algorithm for flow control is not standardized, but control messages, e.g. the message "Capacity Allocation", are standardized. In order to manage the flow control, the RBS calculates the allocations to be carried in the "Capacity Allocation" messages sent to the RNC, and the RNC sends data frames in the HS-DSCH to the RBS according to the information in the "Capacity Allocation" messages, one allocation of capacity for each flow of data. When there is more data to send from the RNC, the information element (IE) "User Buffer Size" (UBS) in the HS-DSCH data frames is larger than zero. When the data frame has emptied the RNC buffer for the respective flow of data, UBS is set to zero.

The flow control algorithm has to manage limitations for both the air-interface and the Iub HS-DSCH bandwidth, Iub being the interface between an RNC and an RBS.

More particularly, the transfer of a data frame in an HS-DSCH from an RNC to an RBS is made in the following way. After the RNC has been granted capacity by the RBS, as obtained from a capacity allocation control frame or from an initial capacity allocation control frame received from the RBS, as described in 3GPP TS 25.433, and the RNC has data waiting to be sent, the data frame is used to transfer the data in the HS-DSCH. If the RNC has been granted capacity by the RBS using the initial capacity allocation control frame as described in 3GPP TS 25.433, this capacity is valid for only the first data frame transmission in the HS-DSCH. When data is waiting to be transferred, and a capacity allocation control frame has been received, a data frame in the HS-DSCH will be transmitted immediately according to the received allocation, i.e. using the bandwidth corresponding to this allocation. Each data frame sent in an HS-DSCH includes the information element "User Buffer Size" to indicate the amount of data pending for a respective flow for an indicated priority level.

In making the transmission of data frames from an RNC to an RBS efficient the Iub HS bandwidth limitations must be considered. When dedicated channels for e.g. voice is connected, the bandwidth for HS-DSCHs will be less, provided that, as will be assumed hereinafter, that these dedicated channels and HSDPA traffic share the same physical link. If the bandwidth for HS-DSCHs causes that HS-DSCH data frames are lost, it has a bad impact on TCP based applications. It is then better to lower the effective bitrate for HS-DSCHs to a level in which the data frame loss ratio becomes reasonable.

SUMMARY

It is an object of the invention to provide an efficient flow control algorithm.

It is another object of the invention to provide a flow control algorithm that adapts the flow of data frames so that data frames can be sent without too high losses and so that buffers in a receiving node always are reasonably filled.

A flow control algorithm in an RBS for controlling HS-DSCH traffic over Iub is used to ensure that there is always a suitable amount of data in the priority queues of the RBS. If is assumed that there are data in an RNC to be sent to the RBS, the priority queues should not get empty nor being overflowed. Too long buffers give too long delays, too short buffers give dry buffers when a user is suddenly scheduled. The flow control algorithm aims at controlling the priority queue flows in a way that they become stable.

There are two bottlenecks, both the air-interface and the Iub interface. Both these bottlenecks are considered in the flow control algorithm. The available HS bandwidth over Iub varies a lot. If too much HS traffic is allocated over Iub, frame losses and long delays degrade the HS packet data performance.

A flow control algorithm in an RBS for controlling HS-DSCH traffic over Iub utilizes a reference value for determining the available bandwidth for the HS-DSCH traffic, the reference value being dynamically adapted by considering detected traffic errors.

An advantage of providing a dynamic reference value for the HS bandwidth in Iub is that severe losses of HS-DSCH data frames can be avoided.

BRIEF DESCRIPTION OF THE DRAWINGS

The invention will now be described by way of non-limiting embodiments with reference to the accompanying drawings, in which.

DETAILED DESCRIPTION

The general flow of information in a system built according to UMTS including both a mobile telephony network and some other network, for information transmitted from the other network to a user equipment (UE) in the mobile telephony network, using high speed downlink packet access (HSDPA), in particular the flow between a radio network controller (RNC) and a radio base station (RBS) in the mobile telephony network, will now be described with reference to FIGS. 3-6. These figures include mainly only units and functions that are relevant to or needed for said general flow of information.

Figure 1:
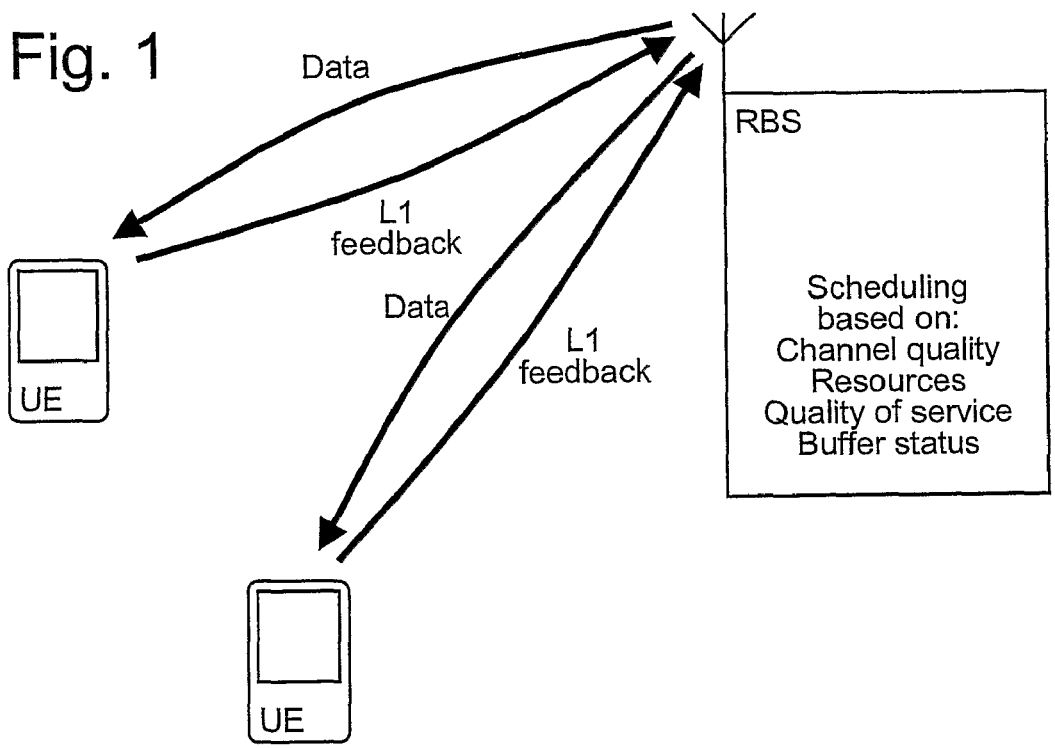
FIG. 1 is a schematic of communication between a radio base station and user equipments using high-speed down-link data transmission.
Figure 2:
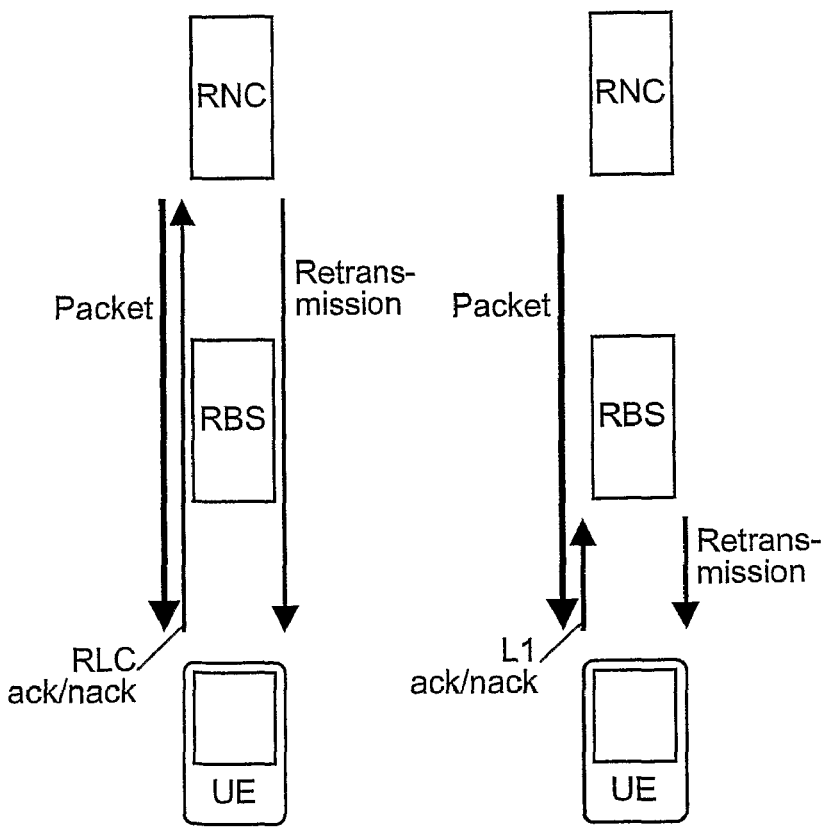
FIG. 2 is a schematic illustrating differences in data transmission to user equipments using a shared downlink channel according to two different methods.
Figure 3:
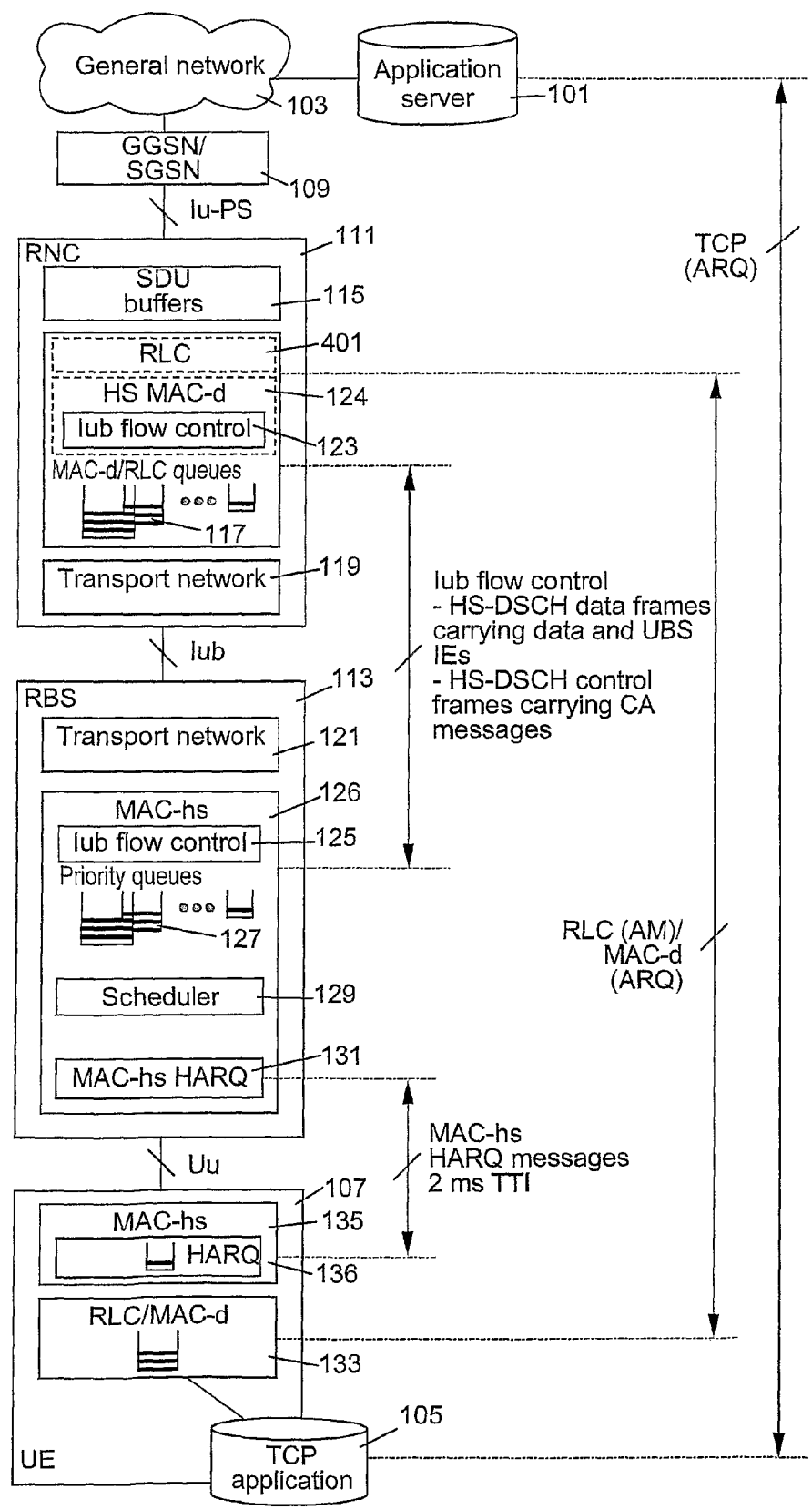
FIG. 3 is a diagram illustrating transmission of data from an application server to an application running in a user equipment using HSDPA and a flow control function for control of Iub.

Many packet data applications use the standardized transmission control protocol (TCP), as specified by IETF, for transmitting data. As seen in FIG. 3, data, such as an Internet page, can e.g. be sent from an application server 101 through a public data network (PDN), also called a general purpose network or general network 103, such as the Internet to an application 105 running in a user equipment 107, i.e. a mobile terminal. The IETF transmission control protocol has a window size of its own, which limits the number of bytes in the different buffers that the data has to pass between the application server 101 and the user equipment. The radio link control (RLC) sublayer has another window size. Automatic repeat request (ARQ) acknowledgement messages are used both according to TCP and in the RLC sublayer for controlling the correctness of transmissions.

The general purpose network 103 is connected through a radio access network (RAN), not shown, to an RNC 111 at a gateway or support node 109, for GPRS this node including a gateway GPRS support node (GGSN) and a serving GPRS support node (SGSN). The gateway GPRS support node is in GPRS a router that serves as a gateway or interface between packet data networks and mobile telephony networks, in particular between a packet data network such as an internet protocol (IP) network (103) and a serving GPRS support node in the mobile telephony network 104.

The interface between a core network and a radio access network (RAN) is generally called Iu and the packet-switched interface between an SGSN and an RNC 111 is called Iu-PS. The interface between the RNC and an RBS 113 is called Iub and the interface between the RBS 113 and the mobile terminal 107 is called Uu.

Packets received from the gateway or support node 109 are first stored in SDU buffers 115.

A flow control (FC) function is used for controlling communication between the RNC 111 and the RBS 113, in particular the flow of data frames in the HS-DSCH, using the Iub interface and has the purpose of keeping priority queues (PQs) 127 in the RBS short and not to overflow the Iub transport network, i.e. the transport network between the RNC and the RBS, see the network portions 119, 121 in FIG. 3.

Iub Architecture for HSDPA

The flow control function includes portions 123, 125 located in the RNC 111 and in the RBS 113, respectively. In the RBS it is a part of the MAC-hs (Media Access Control for HSDPA) function 126. It interacts, using Iub protocol messages carried in Iub control frames, with the flow control portion 123 in the RNC that is part of the MAC-d (Media Access Control, dedicated channels) function 124 in the RNC 111, see also FIG. 4.

The flows that are controlled by the flow control function 123, 125 are the flows of MAC-d protocol data units (PDUs), carried in HS-DSCH data frames according to the Iub frame protocol (FP).

Each MAC-d PDU arriving to the portion 125 of the flow control function in the RBS 113 is stored in one of the priority queues 127, waiting to be selected by the scheduler function 129 of the RBS for transmission over the Uu interface to the user equipment 107.

In the RBS 113 one priority queue 127 is provided for each HS-DSCH MAC-hs connection of the connected user equipments 107 and one controlled flow of MAC-d PDUs is provided over the Iub interface to each priority queue. Each such flow is in the flow control function denoted a priority queue flow (PQF). A priority queue flow is defined as packets arriving for the same user having the same content of the "Common Channel Priority Indicator" (CmCH-PI) field, as defined in standard documents. In practice, in most cases there is for each user equipment only one priority queue flow that then is the downlink traffic flow for the respective user, though generally there may be a plurality of priority queues for each connected user equipment 107.

Each priority queue flow is transported over the Iub interface by one instance of the Iub frame protocol (FP) using a dedicated AAL2 (ATM Adaptation Layer No. 2) connection as transport bearer.

Figure 4:
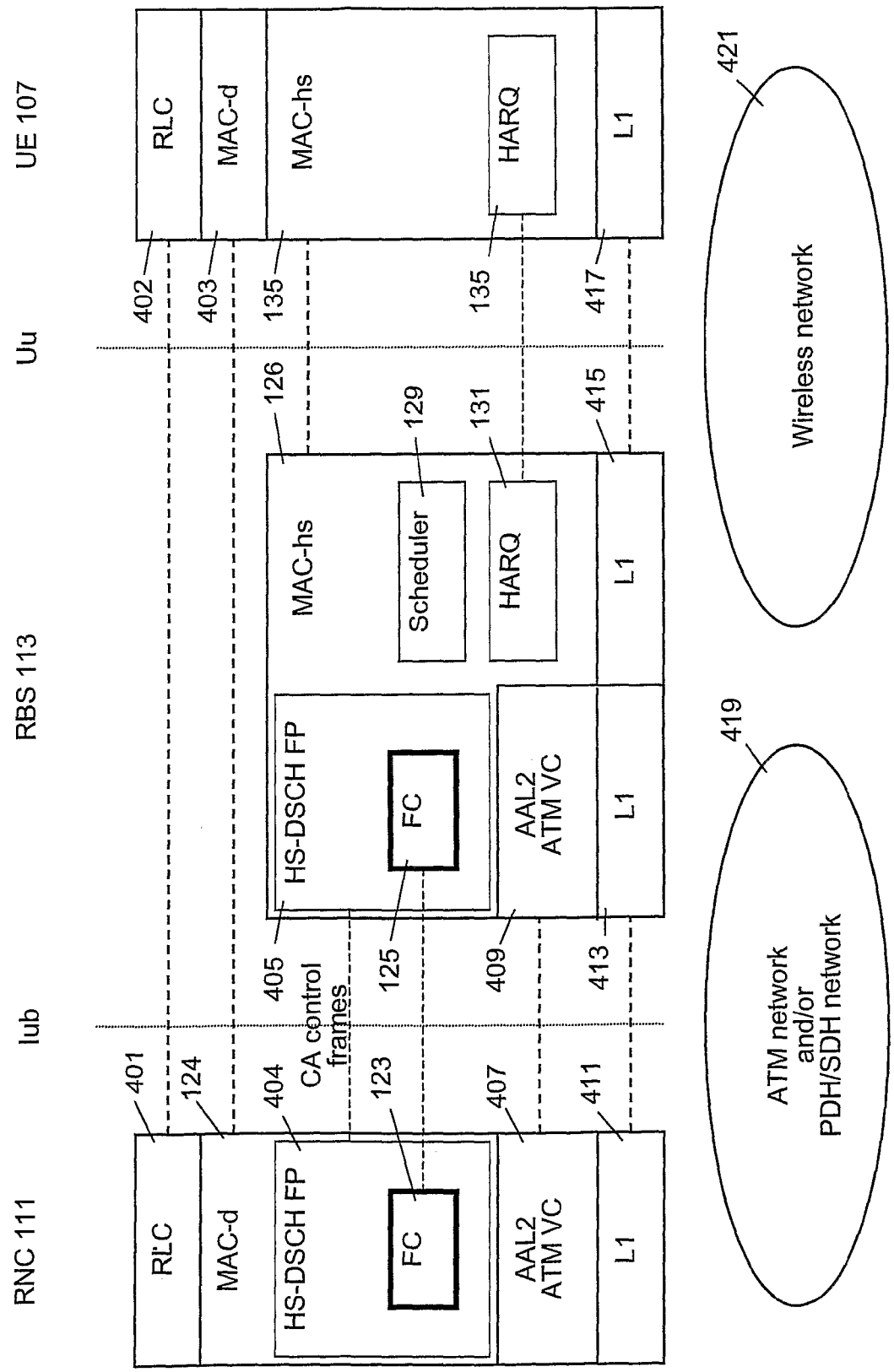
FIG. 4 is a diagram illustrating different layers in communication between an RNC and an RBS using HSDPA.

FIG. 4 illustrates the layer configuration and corresponding units of the Iub and Uu interfaces.

The radio link control sublayer portion 401 of the RNC 111 has the main purpose of ensuring a loss-free, i.e. reliable, link over the radio interface for TCP based data transfer. It provides reliability using error detection and recovery by retransmissions. The RLC 410 communicates with a radio link control sublayer portion 402 included in an RLC/MAC-d portion 133, see FIG. 3, of the user equipment 107.

The MAC-d function 124 in the RNC 111 communicates with an MAC-d function 403 included in the RLC/MAC-d portion 133 of the user equipment 107, see FIG. 3. Furthermore, the MAC-d function of the RNC 111 is here illustrated as including an HS-DSCH FP (Frame Protocol) handling unit 404. This frame protocol handling unit in turn includes the flow control portion 123 and communicates with the flow control portion 125 included in an HS-DSCH FP handling unit 405 of the MAC-hs function 126 of the RBS 113. The MAC-hs function of the RBS includes the flow control portion 125, the scheduler 129 and the MAC-hs HARQ function 131, see FIG. 3. The MAC-hs function 126 in the RBS communicates with the MAC-hs function 135 in the user equipment 107. The MAC-hs function of the user equipment includes an HARQ function 136, see also FIG. 4, communicating with the MAC-hs HARQ function 131 of the RBS 113.

The AAL2/ATM VC layer having portions 407, 409 in the RNC 111 and the RBS 113, and The physical layer (L1) portions 411 in the RNC 111, 413, 415 in the RBS 113 and 417 in the UE 107.

For the communication between the RBS 111 and the RNC a transport network 419 such an ATM network and/or a PDH/SDH network is used, compare the transport network portions 119, 121 of FIG. 3. For the communication between the RBS 111 and the UE 107 a wireless network 421 is used.

Flow Control Messages between RNC and RBS

HSDPA data, i.e. MAC-d PDUs, are sent from the RNC 111 to the RBS 113. Each MAC-d flow of a given priority level is equal to one priority queue flow and is represented by one queue 117 in the RNC and one queue, a priority queue 127, in the RBS. A number of MAC-d PDUs are sent in each HS-DSCH FP data frame, belonging to the same MAC-d flow.

Figure 5:
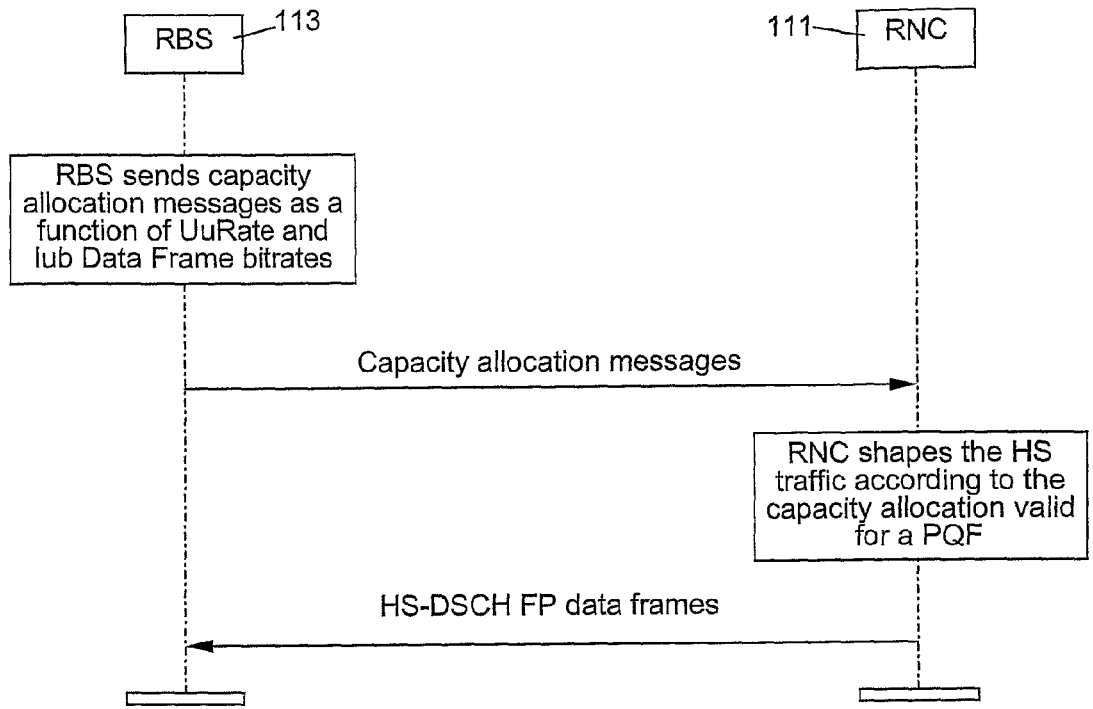
FIG. 5 is a transmission diagram illustrating a principle for flow control using standardized messages.
Figure 6:
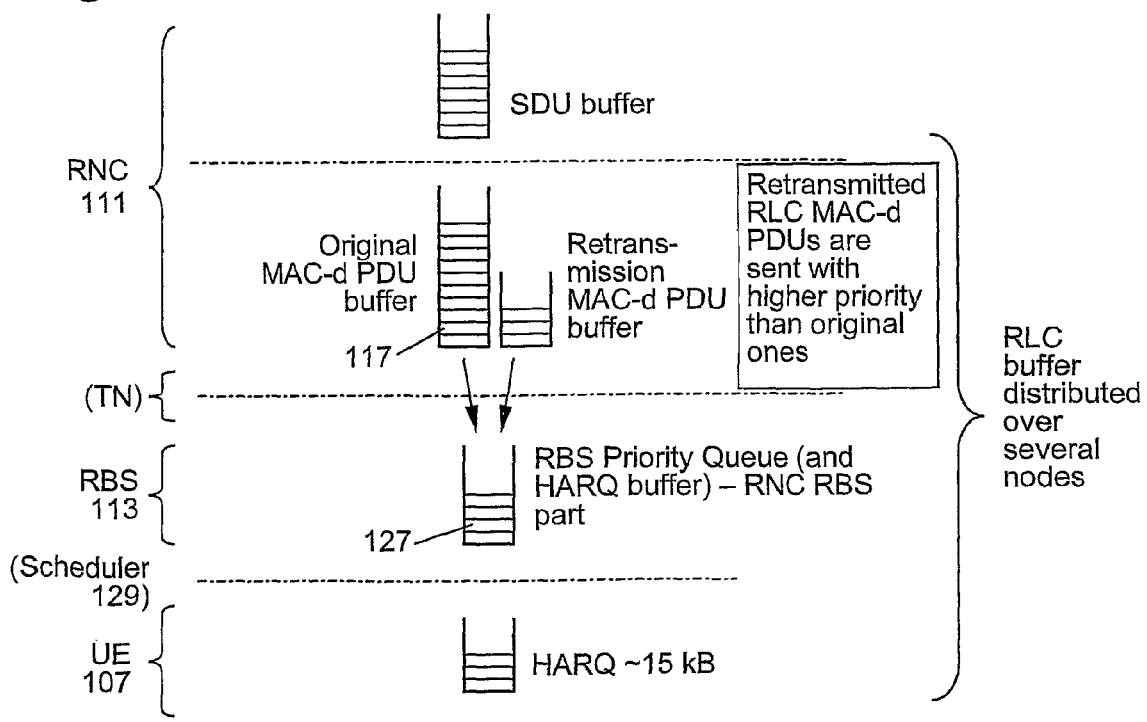
FIG. 6 is a schematic illustrating buffers in an RNC, an RBS and a UE.

Data frames sent over Iub for each priority queue flow are flow controlled using capacity allocation (CA) messages, sent in control frames from the RBS 113 to the RNC 111, see FIG. 5. A capacity allocation message specifies the bitrate in the form of the number of MAC-d PDUs that are allowed to be transmitted during a predetermined time period for the considered priority queue flow.

For a simple case the RBS 113 decides, based on the filling level of the respective buffer, i.e. the length of the respective priority queue, in the RBS, on air interface conditions, i.e. conditions related to the Uu interface, and on transport network congestion in Uu, the bitrate that should be allocated for the given priority queue to be used by the RNC 111 for transmission in the respective HS-DSCH. The RNC shapes data flows according to the last received capacity allocation messages. Message structures can be found in the document 3GPP TS 25.435, in particular FIG. 21A, "Data Frame", and FIG. 36, "Capacity Allocation", and the accompanying text.

The flow control function 123, 125 is aware of the average data rate available for a priority queue flow on the air interface between the RNC 111 and the RBS 113 or at least an estimate of said average data rate. It also knows the number of PDUs from that priority queue flow which are waiting in the RBS buffer for this queue 127. Based on this information the flow control function can decide to change the allocated rate of the considered priority queue flow. The main goal is to keep a target number of PDUs waiting in the RBS 113, i.e. not too many and not too few PDUs in each of the priority queues.

The buffers for the queues 117, 127 are designed in such a way that PDUs are most probably lost only in the transport network of Iu or in the air interface of Uu.

Purpose of using a Flow Control Function

Iub traffic flows in HS-DSCHs are flow controlled by the flow control function 125 of the MAC-hs 126 in the RBS 113. The Iub protocol messages that can be used for flow control are specified in 3GPP TS 25.435 (Iub). The flow control function itself is not standardized.

The purpose of the flow control function is to keep an "appropriate" amount of MAC-d PDUs buffered in the RBS 113, i.e. to keep the RBS priority queues 127 short enough for RLC retransmissions but long enough to ensure throughput when scheduled.

The same logical RLC buffer for the priority queue flows can be seen as distributed over the RNC 111, RBS 113 and UE 107. The MAC-d PDUs to be retransmitted have a higher priority in the RNC than PDUs that are to be sent for the first time from the RNC, see FIG. 6. Therefore the RLC RBS portion, the priority queues 127, shall be "short" or not too long, this being one reason to use a flow control function for controlling transmission in the HS-DSCHs from the RNC 111 to the RBS 113.

HS-DSCH traffic is carried over a "best effort" type of quality of service (QoS) in the transport network 119, 121; 415 between an RNC and an RBS. The flow control function shall regulate the HS-DSCH traffic flow in such a way that loss of MAC-d PDUs, due to too long Iub transport delays, such as caused by overload of the transport network, becomes appropriate. There is a trade-off between having a high frame loss combined with a high bandwidth utilization and a low frame loss combined with a lower bandwidth utilization.

There are mainly two bandwidth capacity bottlenecks for HSDPA traffic in the transport networks between the RNC 111, the RBS 113 and the UE 107, both which must be considered in the flow control function:

The Iub interface

The Uu interface, i.e. the radio interface or air-interface

The HS-DSCH data frames, each frame carrying one or more MAC-d PDUs, are carried over AAL2 in AAL2 packets. These packets are carried over ATM in a "sliding way". Thus, each ATM cell has a "start byte" belonging to the AAL2 architecture defining where in the ATM cell the first AAL2 packet starts. This is used when an ATM cell is lost, to make it possible to find where the next proper AAL2 packet starts. The ATM cells are conveyed over the transport network 119, 121; 419 between the RNC 111 and the RBS 113. If the traffic flow exceeds the available AAL2 path capacity, the transport network may have to discard some AAL2 packets or ATM cells due to overflow of buffers in the transport network. When one or more AAL2 packets of a data frame have been lost, the reassembled data frame reassembled in the RBS will have an erroneous cyclic redundancy checksum (CRC) for the payload and an erroneous length, which can be detected by the RBS. Frame losses can also be caused by bit errors due to poor transmission quality, also resulting in CRC errors, but in most of such cases the frame length will be correct, this offering a possibility to distinguish between the most likely causes of erroneous received data frames.

A frame loss algorithm is described below for detecting Iub overload conditions by observing occurrences of incomplete or faulty HS-DSCH data frames arrived to the RBS 113, the algorithm producing a flag indicating that a loss of at least one data frame has been detected during a predetermined time period, such as a 100 ms interval, for each priority queue flow. When the number of lost data frames for a priority queue flow exceeds a predetermined loss threshold during the predetermined period, the calculated capacity allocation bitrate, caCalcBitrate, for this priority queue flow is temporarily decreased to a predetermined portion, e.g. 50%, of its nominal value, see FIGS. 9 and 10, and sent to the RNC 111 in a CA message.

When the RBS 113 has detected too many losses of data frames in all of the PQFs during another, longer time period, e.g. one second, the value of the variable targetHsRate is decreased. The value of this variable indicates the estimated total bitrate available for transmission of data frames from the RNC 111. This variable gives a reference value which indicates a maximum value of the aggregated bitrate that can be used for the HSDPA HS-DSCH data frames over the Iub interface in the downlink.

Figure 7A:
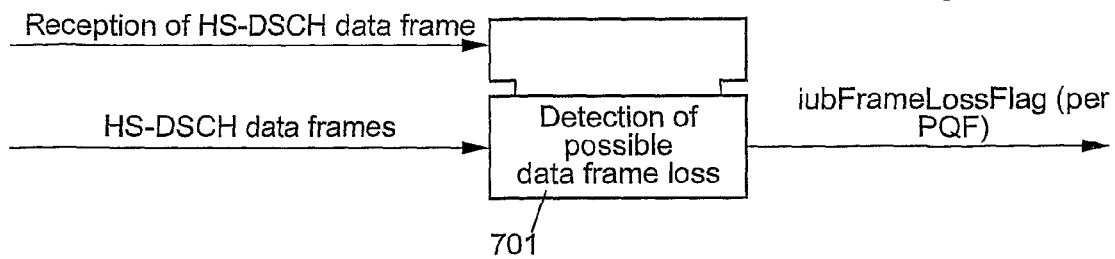
FIG. 7a is a diagram illustrating calculation of the state of a priority queue flow.

In the determination of the flag iubFrameLossFlag indicating at least one frame loss for a priority queue flow during the predetermined time period, the input data are the Iub HS-DSCH data frames from the priority queue flow, see FIG. 7a. Each data frame is evaluated and the flag is set if the data frame is faulty or indicates a fault.

The detection of lost and/or erroneous data frames is made by performing checks on each received data frame as appears from the following pseudocode segment:

---

If CRC of header and CRC of payload in data frame are correct, accept the data frame and set no Flag If CRC of header in data frame is incorrect, discard the frame and set iubFrameLossFlag If CRC of header is correct and CRC of payload in data frame is incorrect, discard data frame and check if the length of data frame length, including CRC of payload, is, in bytes, equal to the value given by the formula:

INT[(4 + (MAC-d PDU Length) + 7)/8]*"NumOfPDU" + 9

If this is true, the incorrect CRC of payload is most likely to have been caused by poor transmission quality and no further action is taken.

If this is false, the incorrect CRC of payload is most likely to have been caused by loss of one or more AAL2 packets and the flag iubFrameLossFlag is set

---

Hence, detection of one or more erroneous data frames during a 100 ms period sets the flag iubFrameLossFlag. Observe that it is not possible to determine how many destroyed frames that have been detected during a time period.

Figure 7B:
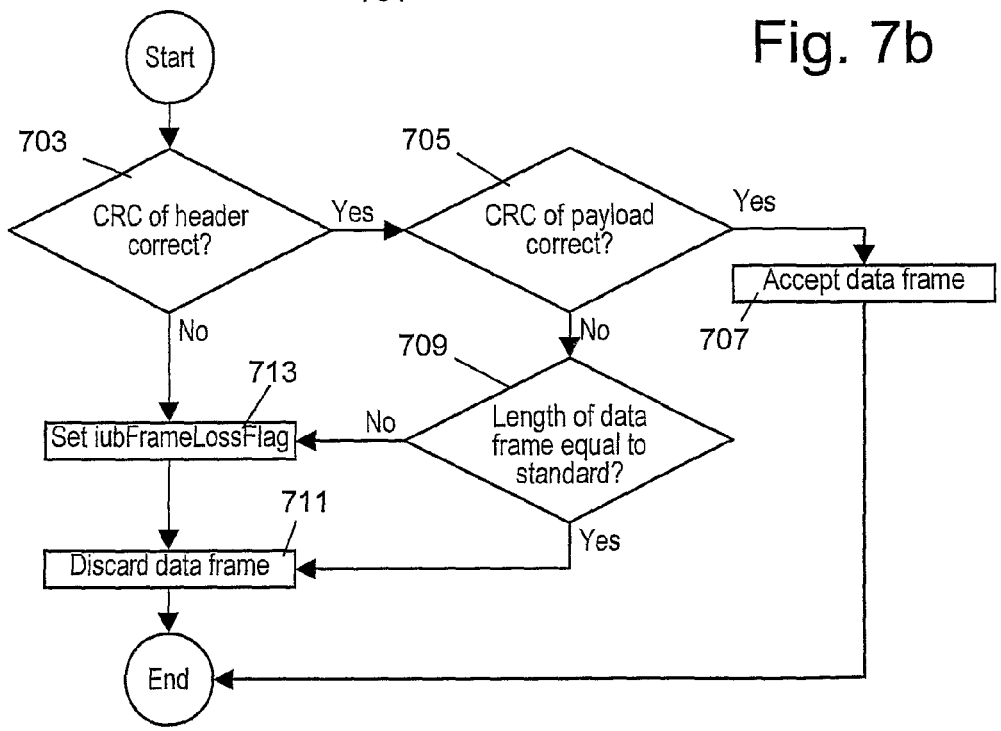
FIG. 7b is a flow chart of steps performed in the calculation of FIG. 7a, FIG. 8a is a state machine of changes of the state of a priority queue flow.

The steps of the detection procedure are illustrated in FIG. 7b. Thus, when a data frame is received, the procedure is started and in a first step 703 is asked whether the CRC of the header field of the data frame is correct. If this is true, it is asked in a step 705 whether the CRC of the payload field of the data frame is correct. If this is true, the data frame is accepted in a step 707. If it was decided in step 705, the CRC of the payload field is not correct, it is decided in a step 709 whether the length of the data frame is correct, i.e. is equal to a standard length such as given by the formula above. If this is true, the data frame is discarded in a step 711. If it was determined in step that the length of the data frame is not correct, the flag iubFrameLossFlag is set in step 713 and then step 711 is performed. If it was determined in step 703 that the CRC of the header field of the data frame is not correct, also steps 713 and 711 are performed.

After at least one indication of an Iub overload has been detected during a 100 ms period, as signaled by the fact that flag iubFrameLossFlag is set, the value of the variable caCalcBitrate that indicates the capacity allocation for the priority queue flow is reduced temporarily by 50%, followed by an increase during an overload free period of a following predetermined time period, such as one second, to come back to the 100% level. The capacity allocation is related to the variable targetHsRate to be described below.

Figure 8A:
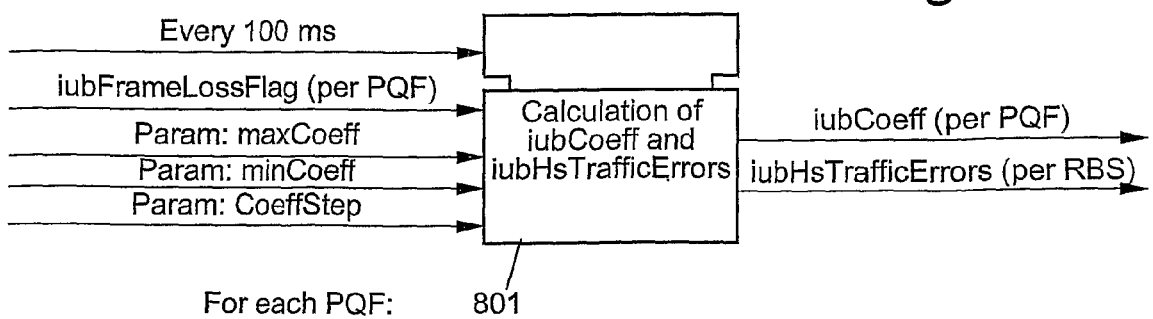
FIG. 8b is a flow chart of steps performed in the procedure of changing steps of FIG. 8a, FIG. 9 is a diagram of a reduction coefficient as a function of time for a single traffic error.

This reduction procedure 801 is illustrated in FIG. 8a and is performed at the end of each predetermined time period. It uses as input the value of the flag iubFrameLossFlag and produces as output a reduction coefficient or factor iubCoeff that is specific to the considered PQF. and 100 ms) and also a modified value of the variable iubHsTrafficErrors that gives an estimate of the number of errors of data frame, as specified for the considered RBS, that have occurred from the start of the current longer time period, having a length of e.g. 1000 ms. The coefficient iubCoeff is thus generally a function of Iub HS traffic error rates. The CA bitrate for a PQF is reduced when an Iub HS traffic error occurs for the flow.

When the flag iubFrameLossFlag is set, i.e. has the value TRUE, the value of the variable caCalcBitrate is reduced used means of the iubCoeff. The iubCoeff is initially and normally equal to maxCoeff that has the value 100%. When an Iub HS traffic error occurs during the predetermined shorter period, the coefficient iubCoeff is always set to a value minCoeff, e.g. equal to 50%, in the next shorter time period. The value of iubCoeff varies between the values minCoeff and maxCoeff, e.g. so that it is never below 50% and never above 100%.

When no Iub HS traffic errors occur during the shorter time period for a PQF, the value of the variable iubCoeff is increased by a predetermined step CoeffStep, e.g. equal to 5% units in relation to 100%.

Figure 9:
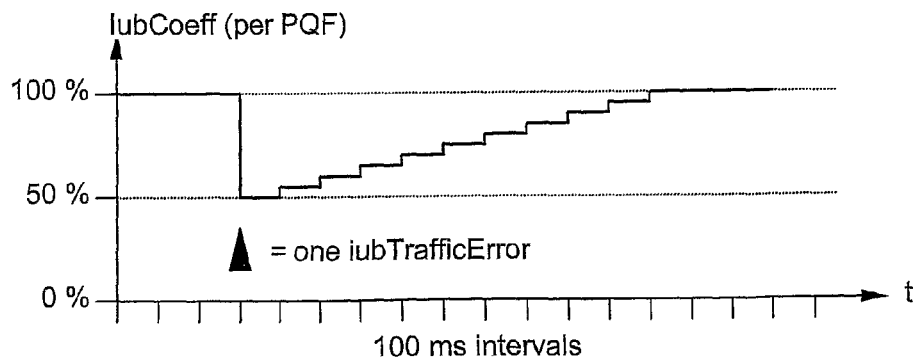

In an example illustrated by the diagram of FIG. 9, after a single Iub HS traffic error followed by no errors the iubCoeff is set to its minimum value of 50% directly after occurrence of the Iub HS traffic error, as indicated by the iubFrameLossFlag having been set. This is followed by an increase of the value of iubCoeff by 5% units every 100 ms interval. After 1 second, the value of iubCoeff has regained its maximum value of 100% again. The lower values of iubCoeff produces corresponding reduced Capacity Allocation bitrates.

Figure 10:
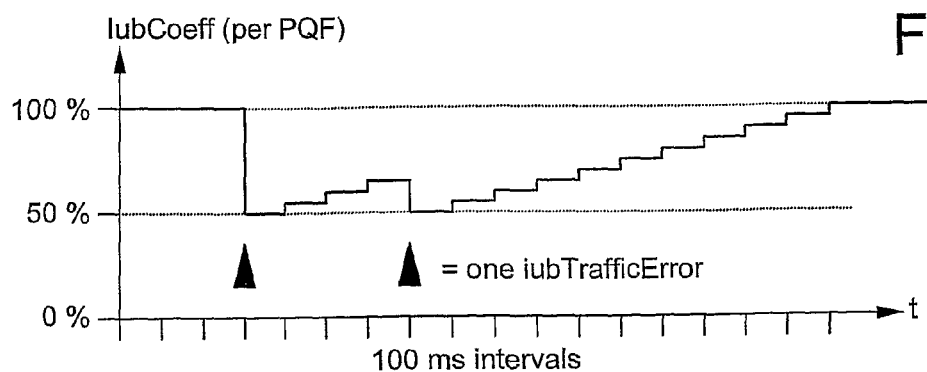
FIG. 10 is a diagram similar to FIG. 9 for two traffic errors.

In another example illustrated by the diagram of FIG. 10, two Iub traffic errors for a PQF have occurred during different shorter time periods of 100 ms, this resulting each time in a reduction of the Capacity Allocation bitrates due to the reduced value of the iubCoeff variable to the 50% level.

Figure 8B:
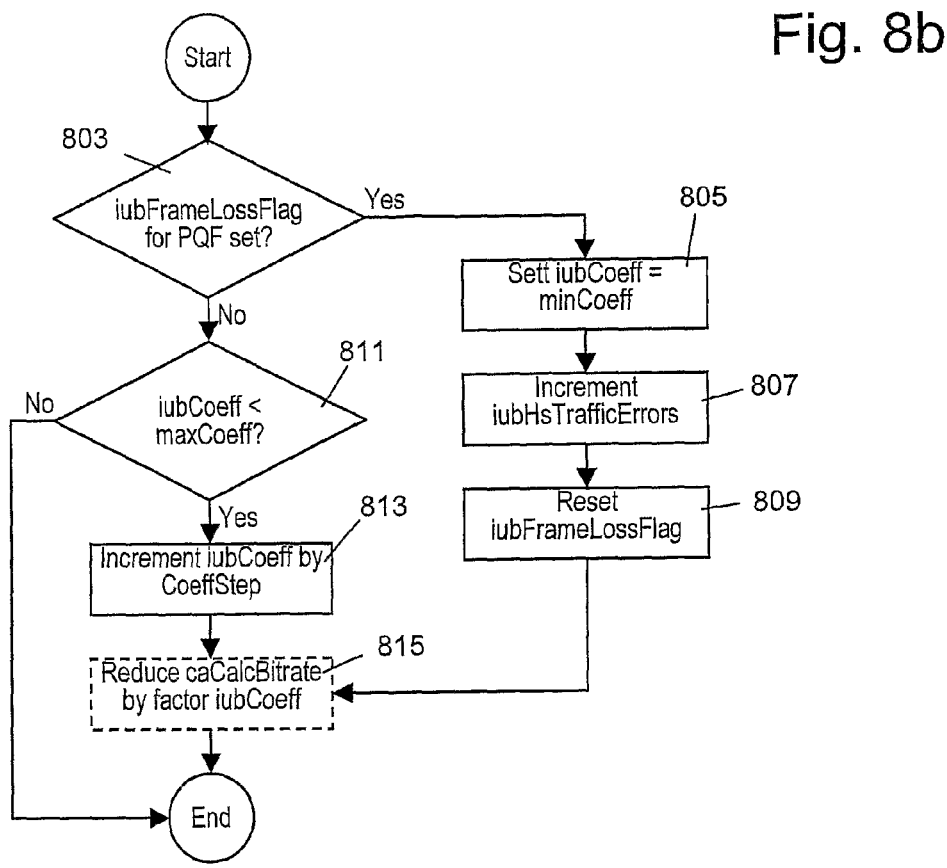

The steps of the procedure for calculating the coefficient iubCoeff for each PQF and simultaneously modifying the value of the error counter iubHsTrafficErrors are illustrated in FIG. 8b. Thus, at the end of each shorter time period and for each priority queue flow it is first tested in a step 803 whether the flag iubFrameLossFlag has been set. If it has been set, in a step 805 the coefficient IubCoeff for this priority queue flow is set to its minimum value minCoeff. Then the counter iubHsTrafficErrors is incremented by one in a step 807 and finally the flag iubFrameLossFlag is reset, i.e. set to the value FALSE, in a step 809. If it was decided in step 803, the flag is not set, it is decided in step 811 whether the coefficient iubCoeff is smaller than its maximum value maxCoeff. If it is true, the coefficient is increased by the value of CoeffStep in a step. After the steps have been performed the capacity allocation for the priority queue flow is reduced in some way using the current value of the coefficient iubCoeff, as indicated by the block 815.

The variable iubHsTrafficErrors is specific to the considered RBS. It is a counter representing all Iub HS traffic errors that have occurred for all PQFs in all shorter time periods during the longer time period.

One Iub HS traffic error is herein equivalent to the detection that one iubFrameLossFlag is set for one PQF during the shorter time period.

In the example, each PQF contributes with a maximum of 10 to the variable iubHsTrafficErrors per one second. Totally, all PQFs in the RBS 113 can for example together contribute with hundreds of increments per second if a lot of Iub HS traffic errors occur.

Thus, each time when the variable iubCoeff for a PQF is set to its minimum value, even if it already had at its lowest value, the variable iubHsTrafficErrors is incremented by one. The variable iubHsTrafficErrors is reset to zero after being read, see the description with reference to FIGS. 11a and 11b. This is done at the end of every long time interval by a target HS rate function block 1101.

Figure 11A:
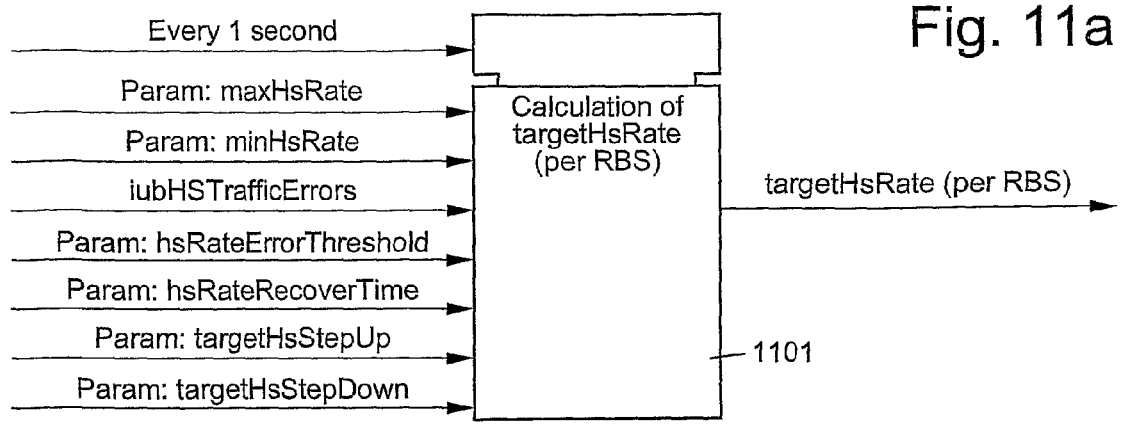
FIG. 11a is a state machine illustrating calculation of a variable representing a maximum aggregated bitrate.
Figure 11B:
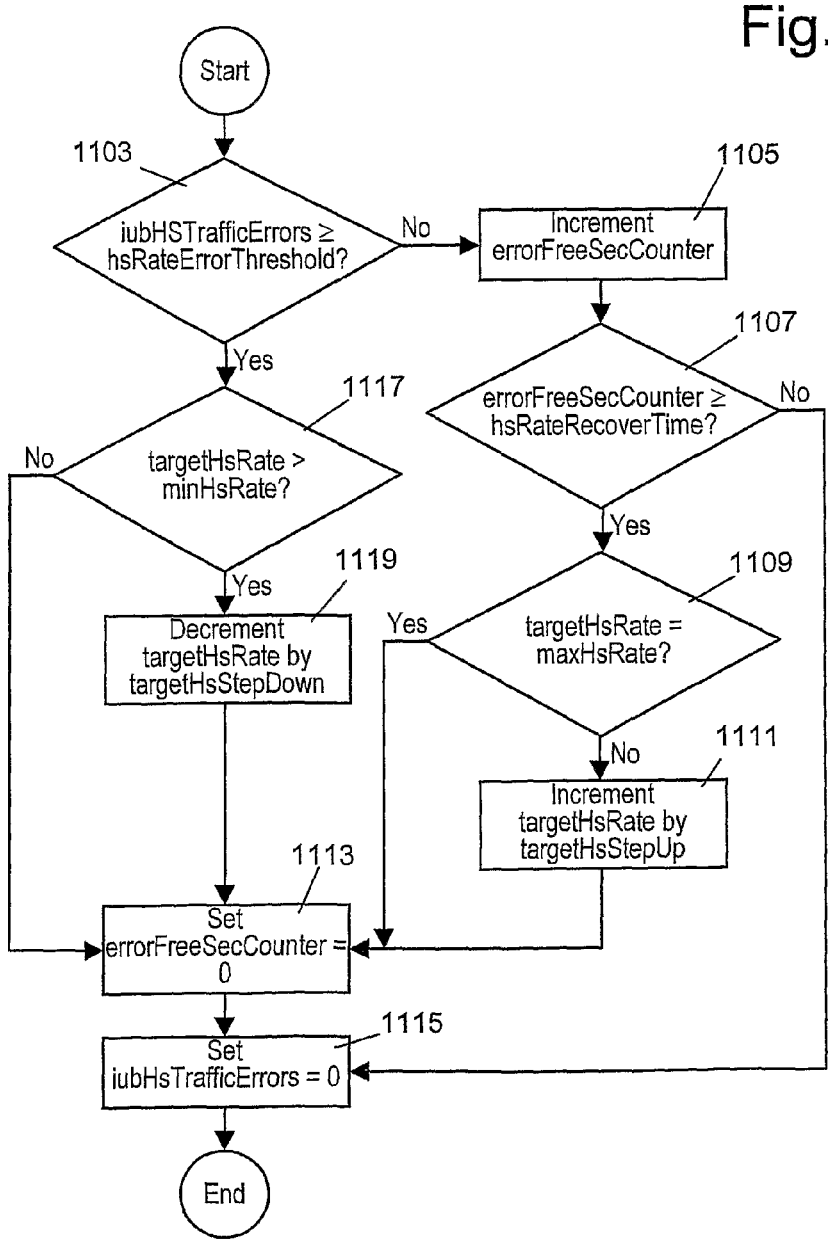
FIG. 11b is a flow chart of steps performed in the calculation of FIG. 11a, and FIG. 12 is a schematic of a radio base station illustrating a flow control unit and related memory cells.

The variable targetHsRate represents the maximum aggregated caCalcBitrate that can be allocated to all PQFs in the same RBS. targetHsRate is limited by a minimum value minHsRate and a maximum value maxHsRate and has an initial value maxHsRate. The calculation of targetHsRate is illustrated in FIGS. 11a and 11b.

The variable targetHsRate is sensitive to too many Iub HS traffic errors. If e.g. 5 or more Iub HS traffic errors have been detected during one second, from any of the PQFs in the RBS, the value of the variable targetHsRate is decreased by a decrement targetHsStepDown, e.g. equal to 2% units, in relation to the maximum value maxHsRate. If less than 5 errors has been detected per second over the longer time period of e.g. 1 second, the value of the variable targetHsRate is increased by a increment targetHsStepUp, e.g. equal to 1% units in relation to the maximum value maxHsRate.

The current value of the variable targetHsRate is used as a reference when Capacity Allocation bitrates are calculated. A capacity allocation for a priority queue can e.g. be calculated as $$CA = \text{or } \propto (\text{targetHsRate}) \cdot (\text{iubCoeff}) / (\text{sum of all iubCoeffs})$$

The procedure 1101 for calculating the value of the variable targetHsRate has as input the parameters minHsRate, maxHsRate, hsRateIubErrorThreshold, hsRateRecoverTime, targetHsStepUp and targetHsStepDown. It has the input variable iubHsTrafficErrors and produces as output a new value of the variable targetHsRate. The output variable targetHsRate is basically a function of the variable IubHsTrafficErrors and is given a new value at the end of every longer time period by performing the procedure, as appears from the following segment of pseudocode:

```
---
IF iubHsTrafficErrors >= hsRateIubErrorThreshold
THEN
- decrease targetHsRate by targetHsStepDown if larger than minHsRate
- set errorFreeSecCounter = 0
ELSE
    increment errorFreeSecCounter by 1
    IF errorFreeSecCounter >= hsRateRecoverTime
    THEN
    - increase targetHsRate by targetHsStepUp if smaller than maxHsRate
    - set errorFreeSecCounter = 0
    ELSE
End IF
set iubHsTrafficErrors=0
---
```

The steps of the procedure 1101 is also illustrated by the diagram of FIG. 11b. In a first step 1103 it is decided whether the number of traffic errors as given by the current value of the counter iubHsTrafficErrors is larger than some small, allowable threshold value, called hsRateIubErrorThreshold. If it is not larger, another counter for counting then number of longer successive time periods in which the number of errors has been allowable and thus has not exceeded the threshold value, the counter called errorFreeSecCounter, is incremented by one in a step 1105. Then it is tested in a step 1107 whether the current value of this counter is higher than another threshold value called hsRateRecoverTime. If it is true, this meaning that there been an allowable number of traffic errors during a sufficiently long time, a step 1109 is performed in which it is determined whether the current value of the variable targetHsRate is equal to its maximum value maxHsRate. If it is no true, a step 1111 is performed in which the current value of targetHsRate is incremented by targetHsStepUp.Then in a step 1113 the counter errorFreeSecCounter for longer time periods having an allowable amount of traffic errors is to zero. Finally the counter ubHsTrafficErrors for the total number of errors is set to zero in a step 1115. If it was decided in step 1109 that the value of targetHsRate is equal to maxHsRate, also the steps 1113 and 1115 are performed. If it was decided in step 1107 that the value of errorFreeSecCounter is higher than hsRateRecoverTime, step 1115 is also performed. If it was decided in block 1103 that the current value of iubHsTrafficErrors is larger than hsRateIubErrorThreshold, a step 1117 is executed in which it is tested whether the current value of targetHsRate is equal to its minimum value minHsRate. If it is larger, the current value is reduced by the value of the parameter targetHsStepDown in a step 1119. Then the steps 1113 and 1115 are performed as above. If it was decided in block 1117 that the value of targetHsRate is equal to minHsRate, steps 1113 and 1115 are executed.

Figure 12:
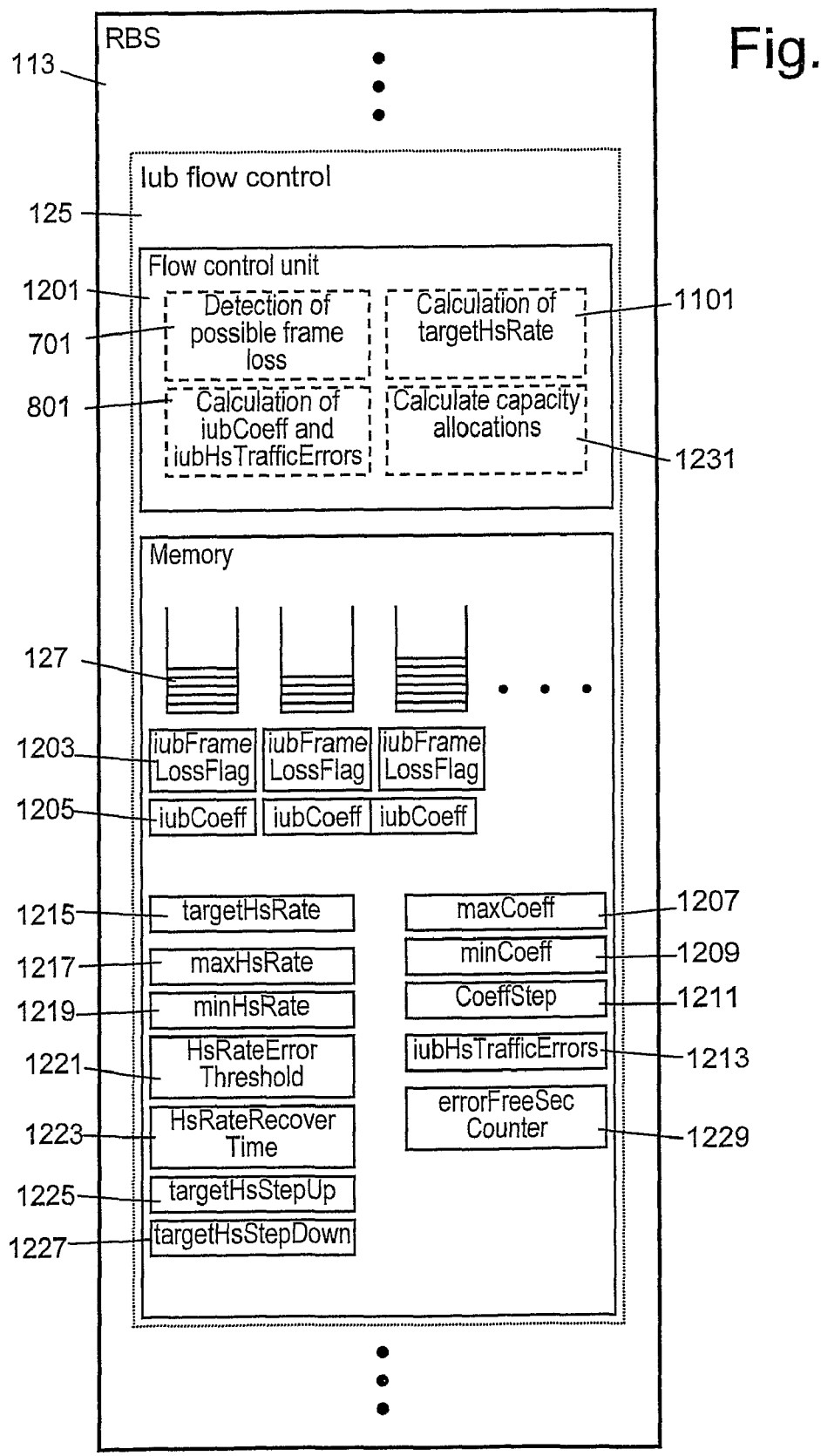

For performing the flow control function a flow control unit 1201 and special memory cells have to be introduced in the RBS 133 as seen in the diagram of FIG. 12. The memory cells include, for each priority queue 127 and hence for each priority queue flow a memory cell 1203 for storing the value of the flag iubFrameLossFlag and a memory cell 1205 for storing the reduction coefficient iubCoeff. Memory cells 1207, 1209 and 1211 are provided for the fixed parameter values maxCoeff, minCoeff and CoeffStep used in calculating the coefficients. A memory cell 1213 holds the current value of the counter iubsHsTrafficErrors and another cell 1215 the current value of the variable targetHsRate. Memory cells 1217-1227 hold the fixed parameter values used in calculating the value of the variable targetHsRate. A memory cell 1229 holds the current value of the counter for error-free periods, errorFreeSecCounter. The flow control unit 1201 includes the unit 701 for detecting possible frame loss, the unit 801 for calculating the coefficients iubCoeffs and incrementing the error counter iubTrafficErrors, the unit 1101 for calculating or modifying targetHsRate and a unit 1231 for calculating the capacity allocation based on the coefficients and the value of the variable targetHsRate.

The invention claimed is:

1. A network including a data transmitting node and a data receiving node, wherein data frames are transmitted from the data transmitting node to the data receiving node, each data frame carrying information belonging to one of a plurality of data flows, said network comprising:
within the data receiving node, a first processor coupled to a first memory for storing computer program instructions, wherein when the first processor executes the computer program instructions, the data receiving node is caused to:
determine for each of the data flows, at the end of a first time period having a predetermined first length, an estimate of or a measure representing the total number of received data frames that have been faulty during the first time period, wherein faulty frames include both lost frames and frames received with errors;
calculate based on the determined estimates or measures for all of the data flows, a bandwidth capacity reference value determining the currently allowable total maximum bandwidth for transmission in all of the data flows from the data transmitting node to the data receiving node, wherein the bandwidth capacity reference value is calculated utilizing bandwidth capacity information for all of the data flows and the estimates or measures of faulty data frames, without measuring bottleneck buffer levels; and
generate and send a capacity allocation message to the data transmitting node, the capacity allocation message specifying a bit rate that the data transmitting node is allowed to transmit to the data receiving node during a predetermined time period for an identified priority queue flow, wherein the bit rate is based on the bandwidth capacity reference value; and
within the data transmitting node, a second processor coupled to a second memory for storing computer program instructions, wherein when the second processor executes the computer program instructions, the data transmitting node is caused to shape the identified priority queue flow according to the received capacity allocation message;
wherein data buffers in the data receiving node are maintained at a level low enough for handling required retransmissions and high enough to ensure throughput when scheduled.

2. The network according to claim 1, wherein when the bandwidth capacity reference value is larger than a minimum value, the data receiving node is configured to reduce the bandwidth capacity reference value by a predetermined step-down amount if the determined estimate or measure is larger than or equal to a threshold value.

3. The network according to claim 1, wherein when the bandwidth capacity reference value is smaller than a maximum value, the data receiving node is configured to increase the bandwidth capacity reference value by a predetermined step-up amount if the determined estimate or measure is smaller than a threshold value.

4. The network according to claim 1, wherein the data receiving node is configured to detect at the reception of each data frame, whether the received data frame is faulty.

5. The network according to claim 1, wherein the data transmitting node is a radio network controller and the data receiving node is a radio base station in a universal mobile telecommunications system (UMTS).

6. A data receiving node in a network having a data transmitting node, wherein the data transmitting node transmits data frames to the data receiving node, each data frame carrying information belonging to one of a plurality of data flows, said data receiving node comprising a processor coupled to a memory for storing computer grogram instructions, wherein when the processor executes the computer program instructions, the data receiving node is caused to:
determine for each of the data flows, at the end of a first time period having a predetermined first length, an estimate of or a measure representing the total number of received data frames that have been faulty during the first time period, wherein faulty frames include both lost frames and frames received with errors;
calculate based on the determined estimates or measures for all of the data flows, a bandwidth capacity reference value determining the currently allowable total maximum bandwidth for transmission in all of the data flows from the data transmitting node to the data receiving node, wherein the bandwidth capacity reference value is calculated utilizing bandwidth capacity information for all of the data flows and the estimates or measures of faulty data frames, without measuring bottleneck buffer levels;

generate and send a capacity allocation message to the data transmitting node, the capacity allocation message specifying a bit rate that the data transmitting node is allowed to transmit to the data receiving node during a predetermined time period for an identified priority queue flow, wherein the bit rate is based on the bandwidth capacity reference value; and store data frames in a plurality of data buffers;

wherein the capacity allocation message causes a flow control unit in the data transmitting node to shape the identified priority queue flow so that the data buffers in the data receiving node are maintained at a level low enough for handling required retransmissions and high enough to ensure throughput when scheduled.

7. The data receiving node according to claim 6, wherein when the bandwidth capacity reference value is larger than a minimum value, the data receiving node is configured to reduce the bandwidth capacity reference value by a predetermined step-down amount if the determined estimate or measure is larger than or equal to a threshold value.

8. The data receiving node according to claim 6, wherein when the bandwidth capacity reference value is smaller than a maximum value, the data receiving node is configured to increase the bandwidth capacity reference value by a predetermined step-up amount if the determined estimate or measure is smaller than a threshold value.

9. The data receiving node according to claim 6, wherein the data receiving node is configured to detect at the reception of each data frame, whether the received data frame is faulty.

10. The data receiving node according to claim 6, wherein the data transmitting node is a radio network controller and the data receiving node is a radio base station, the data transmitting node transmitting the data frames in high-speed downlink shared channels (HS-DSCHs), in a universal mobile telecommunications system (UMTS).

11. A method of controlling transmission of data frames from a data transmitting node to a data receiving node, each data frame carrying information belonging to one of a plurality of data flows, the method comprising the steps of:

determining by the data receiving node, for each of the data flows, at the end of a first time period having a predetermined first length, an estimate of or a measure representing the total number of received data frames that have been faulty during the first time period, wherein faulty frames include both lost frames and frames received with errors;

calculating by the data receiving node, based on the determined estimates or measures for all of the data flows, a bandwidth capacity reference value determining the currently allowable total maximum bandwidth for transmission in all of the data flows from the data transmitting node to the data receiving node, wherein the calculating step includes calculating the bandwidth capacity reference value utilizing bandwidth capacity information for all of the data flows and the estimates or measures of faulty data frames, without measuring bottleneck buffer levels;

generating by the data receiving node, a capacity allocation message specifying a bit rate that the data transmitting node is allowed to transmit during a predetermined time period for an identified priority queue flow, wherein the bit rate is based on the bandwidth capacity reference value; and sending the capacity allocation message to the data transmitting node;

wherein the capacity allocation messages causes the data transmitting node to shape the identified priority queue flow so that data buffers in the data receiving node are maintained at a level low enough for handling required retransmissions and high enough to ensure throughput when scheduled.

12. The method according to claim 11, wherein in the step of calculating, in the case where the bandwidth capacity reference value is larger than a minimum value, the bandwidth capacity reference value is reduced by a predetermined step-down amount if the determined estimate or measure is larger than or equal to a threshold value.

13. The method according to claim 11, wherein in the step of calculating, in the case where the bandwidth capacity reference value is smaller than a maximum value, the bandwidth capacity reference value is increased by a predetermined step-up amount if the determined estimate or measure is smaller than a threshold value.

14. The method according to claim 11, wherein the data transmitting node is a radio network controller and the data receiving node is a radio base station, the data transmitting node transmitting the data frames in high-speed downlink shared channels (HS-DSCHs) in a universal mobile telecommunications system (UMTS).

* * * * *